US008339076B2

(12) United States Patent
Aoki et al.

(10) Patent No.: US 8,339,076 B2
(45) Date of Patent: Dec. 25, 2012

(54) ELECTRIC MOTOR DRIVE CONTROL APPARATUS

(75) Inventors: Takeshi Aoki, Anjo (JP); Subrata Saha, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 333 days.

(21) Appl. No.: 12/662,882

(22) Filed: May 10, 2010

(65) Prior Publication Data

US 2010/0327786 A1 Dec. 30, 2010

(30) Foreign Application Priority Data

Jun. 30, 2009 (JP) ................. 2009-155395

(51) Int. Cl.
*H02P 6/16* (2006.01)
(52) U.S. Cl. ............... 318/400.04; 318/727; 318/661; 318/605; 318/603; 318/432
(58) Field of Classification Search ........... 318/400.04, 318/727, 603, 432, 661, 605
See application file for complete search history.

(56) References Cited

U.S. PATENT DOCUMENTS

| 6,674,262 | B2 * | 1/2004 | Kitajima et al. | 318/722 |
| 6,694,287 | B2 * | 2/2004 | Mir et al. | 702/183 |
| 7,723,945 | B2 * | 5/2010 | Okamura | 318/805 |
| 2004/0150359 | A1 | 8/2004 | Yaguchi et al. | |

FOREIGN PATENT DOCUMENTS

| DE | 103 34 471 A1 | 7/2004 |
| DE | 10 2004 030 326 A1 | 2/2006 |
| JP | A-2004-222448 | 8/2004 |
| JP | A-2008-76078 | 4/2008 |
| JP | A-2008-256486 | 10/2008 |

OTHER PUBLICATIONS

International Search Report mailed Aug. 24, 2010in international Application No. PCT/JP2010/059026 (with translation).
Jul. 9, 2012 Office Action issued in German Patent Application 11 2010 001309.

* cited by examiner

*Primary Examiner* — Walter Benson
*Assistant Examiner* — David Luo
(74) *Attorney, Agent, or Firm* — Oliff & Berridge, PLC

(57) ABSTRACT

An electric motor drive control apparatus includes a detection angle obtaining section that obtains the detection angle of the resolver; a correction information storage section that stores correction information for correcting the detection angle, in association with a modulation ratio that is a ratio of an effective value of a fundamental wave component of the AC voltage to the system voltage; and a detection angle correcting section that obtains the correction information from the correction information storage section, based on the modulation ratio at the time the detection angle obtaining section obtains the detection.

9 Claims, 5 Drawing Sheets

| SYSTEM VOLTAGE Vdc | MODULATION RATIO m | ID |
|---|---|---|
| 280V<Vdc≤300V | m<0.1 | 1 |
| | 0.1≤m<0.2 | 2 |
| | 0.2≤m<0.3 | 3 |
| | 0.3≤m<0.4 | 4 |
| | 0.4≤m<0.61 | 5 |
| | 0.61≤m<0.78 | 6 |
| | m=0.78 | 7 |
| 280V<Vdc≤280V | m<0.1 | 8 |
| | 0.1≤m<0.2 | 9 |
| | 0.2≤m<0.3 | 10 |
| | 0.3≤m<0.4 | 11 |
| | 0.4≤m<0.61 | |

ELECTRIC MOTOR DRIVE CONTROL APPARATUS

INCORPORATION BY REFERENCE

The disclosure of Japanese Patent Application No. 2009-155395 filed on Jun. 30, 2009 including the specification, drawings and abstract is incorporated herein by reference in its entirety.

BACKGROUND

The present invention relates to electric motor drive control apparatuses having a DC/AC converting section that converts a direct current (DC) system voltage to an alternating current (AC) voltage by using a detection angle of a resolver provided for a rotor of an AC electric motor, and supplies the AC voltage to the AC electric motor.

Drive apparatuses having an AC electric motor are sometimes provided with a resolver for accurately detecting the rotational position of a rotor with respect to a stator, in order to accurately control the speed of the AC electric motor. The resolver includes a sensor rotor and a sensor stator, and the sensor rotor is structured so as to rotate integrally with the rotor. Thus, processing an output signal of the resolver to detect the rotational position of the sensor rotor enables the rotational position of the rotor to be detected. The electric motor drive control apparatus converts a DC voltage supplied from a DC power source to an AC voltage by an inverter, based on the rotational position of the rotor detected by the resolver, and the like, and supplies the AC voltage to the AC electric motor, thereby controlling driving of the AC electric motor. More specifically, the electric motor drive control apparatus determines the phase of a current that is applied to the AC electric motor, based on the rotational position of the rotor, and switches switching devices of the inverter according to the determination.

As described above, the phase of the current that is applied to the AC electric motor is determined based on the detection value of the resolver. Thus, if the detection value has an error, the phase of the current that is applied to the AC electric motor becomes different from the phase of a current that should actually be applied to the AC electric motor. This causes problems such as a decrease in output torque of the AC electric motor, and an increase in ripples of electric power that is drawn from the DC power source. Regarding such problems caused by the detection error of the resolver, Japanese Patent Application Publications No. JP-A-2008-76078 and No. JP-A-2008-256486 below describe structures for correcting the detection value of the resolver based on angle correction data. More specifically, Japanese Patent Application Publication No. JP-A-2008-76078 describes a method for improving angle detection accuracy, where a plurality of angle correction data are provided in association with the temperature and the operating time of an equipment provided with a resolver, and the angle detection accuracy is improved by switching among the angle correction data tables according to the temperature and the operating time of the equipment. Japanese Patent Application Publication No. JP-A-2008-256486 describes that a plurality of angle correction data are provided in association with the amount of current that is supplied to an AC electric motor, and an error due to a leakage magnetic flux from the AC electric motor is corrected by correcting a detection value of a resolver by using angle correction data corresponding to a detected current value.

SUMMARY

In the state where an AC voltage is supplied to an AC electric motor by a switching operation of switching devices of an inverter, electric or magnetic noise that is generated by the switching devices (hereinafter simply referred to as the "switching noise") can affect a detection signal of a resolver. Studies conducted by the inventors have demonstrated that the state where the switching noise, which affects a detection signal of a resolver, is generated generally changes according to a specific operating state of an AC electric motor. However, the structures described in the above Japanese Patent Application Publications No. JP-A-2008-76078 and No. JP-A-2008-256486 cannot correct a detection error of the resolver caused by the switching noise.

Thus, it is desired to implement an electric motor drive control apparatus capable of correcting a detection angle of a resolver in view of the operating state of an AC electric motor which affects the state of the switching noise.

According to a first aspect of the present invention, an electric motor drive control apparatus including a DC/AC converting section that converts a DC system voltage to an AC voltage by using a detection angle of a resolver provided for a rotor of an AC electric motor, and supplies the AC voltage to the AC electric motor has a characteristic structure including: a detection angle obtaining section that obtains the detection angle of the resolver; a correction information storage section that stores correction information for correcting the detection angle, in association with a modulation ratio that is a ratio of an effective value of a fundamental wave component of the AC voltage to the system voltage; and a detection angle correcting section that obtains the correction information from the correction information storage section, based on the modulation ratio at the time the detection angle obtaining section obtains the detection angle, and corrects the detection angle based on the correction information.

In general, the AC electric motor can have various operating points that are determined by the rotational speed and the output torque of the AC electric motor. However, if the modulation ratio of the AC voltage that is supplied to the AC electric motor is the same, the on/off timing of a switching device included in the DC/AC converting section is basically substantially the same, regardless of the rotational speed and the output torque. As used herein, the "on/off timing of the switching device" means that the timing with respect to the rotational position of the resolver, and the same applies to the following description unless otherwise specified. In view of such a relation between the modulation ratio and the on/off timing of the switching device, the inventors have found that the influence of switching noise on a detection signal of the resolver is similar if the modulation ratio is the same. That is, the inventors have found that, regarding the influence of the switching noise, the operating state of the AC electric motor can be divided into a plurality of operating states in a simple manner according to the modulation ratio, instead of according to the rotational speed and the output torque.

The present invention was developed based on the above finding. According to the above characteristic structure, different correction information is used according to the modulation ratio that affects the state of the switching noise, whereby a detection error of the resolver due to the switching noise can be appropriately corrected. Note that it is also possible to divide the operating state of the rotary electric machine into a plurality of operating states according to the rotational speed and the output torque, and to store the correction information in association with the operating states. However, the present invention enables the operating state of the AC electric motor to be divided into a plurality of operating states in a simpler manner, as compared to the above structure. Thus, the amount of data of the correction information to be stored can be reduced, and the operating state can be determined by a simpler structure when selecting the correction information.

The correction information stored in the correction information storage section may include information for correcting an error of the detection angle, which increases with an increase in switching noise of a switching device included in the DC/AC converting section.

According to this structure, the detection angle of the resolver can be appropriately corrected in view of the detection error of the resolver which increases with an increase in switching noise.

The correction information storage section may store a correction value map, which defines a correction value for the detection angle, for each of a plurality of modulation ratio ranges that are determined by dividing a possible value range of the modulation ratio into a plurality of regions, and the detection angle correcting section may obtain the correction information from the correction value map corresponding to the modulation ratio range that includes the modulation ratio at the time the detection angle obtaining section obtains the detection angle.

According to this structure, since the correction value map is stored for each of the modulation ratio ranges, the amount of data of the correction information that is stored in the correction information storage section can be reduced. Moreover, since the correction value map has a correction value for the detection angle, the structure of the detection angle correcting section can be simplified.

The DC/AC converting section may be structured to be able to switch between a plurality of control methods that use different switching methods for conversion from each other, the correction information storage section may store the correction information in association with the control methods as well, and the detection angle correcting section may obtain the correction information from the correction information storage section, based also on the control method at the time the detection angle obtaining section obtains the detection angle.

If the control method is different, the on/off timing of the switching device becomes different even if the modulation ratio is the same, and thus, the influence of the switching noise on the detection signal of the resolver becomes different. According to the above structure, the detection angle of the resolver can be appropriately corrected in the case of using a plurality of control methods.

The electric motor drive control apparatus may further include a system voltage obtaining section that obtains the system voltage, the correction information storage section may store the correction information in association with the system voltage as well, and the detection angle correcting section may obtain the correction information from the correction information storage section, based also on the system voltage at the time the detection angle obtaining section obtains the detection angle.

If the system voltage is different, the amount of switching noise that is generated becomes different even if the on/off timing of the switching device is the same, and thus, the influence of the switching noise on the detection signal of the resolver becomes different. According to the above structure, the detection angle of the resolver can be appropriately corrected in the case where the system voltage changes.

Technical features of the electric motor drive control apparatus of the present invention having each of the above structures may be applied to methods and programs for correcting a detection angle, which are intended for electric motor drive control apparatuses. Thus, the present invention can cover such methods and programs.

It should be understood that the above functions and effects of the electric motor drive control apparatus can be obtained by such methods and programs for correcting a detection angle, which are intended for electric motor drive control apparatuses, and some additional techniques shown as examples of preferred structures of the electric motor drive control apparatus may be incorporated into the methods and programs as described above.

DETAILED DESCRIPTION OF EMBODIMENTS

Figure 1:
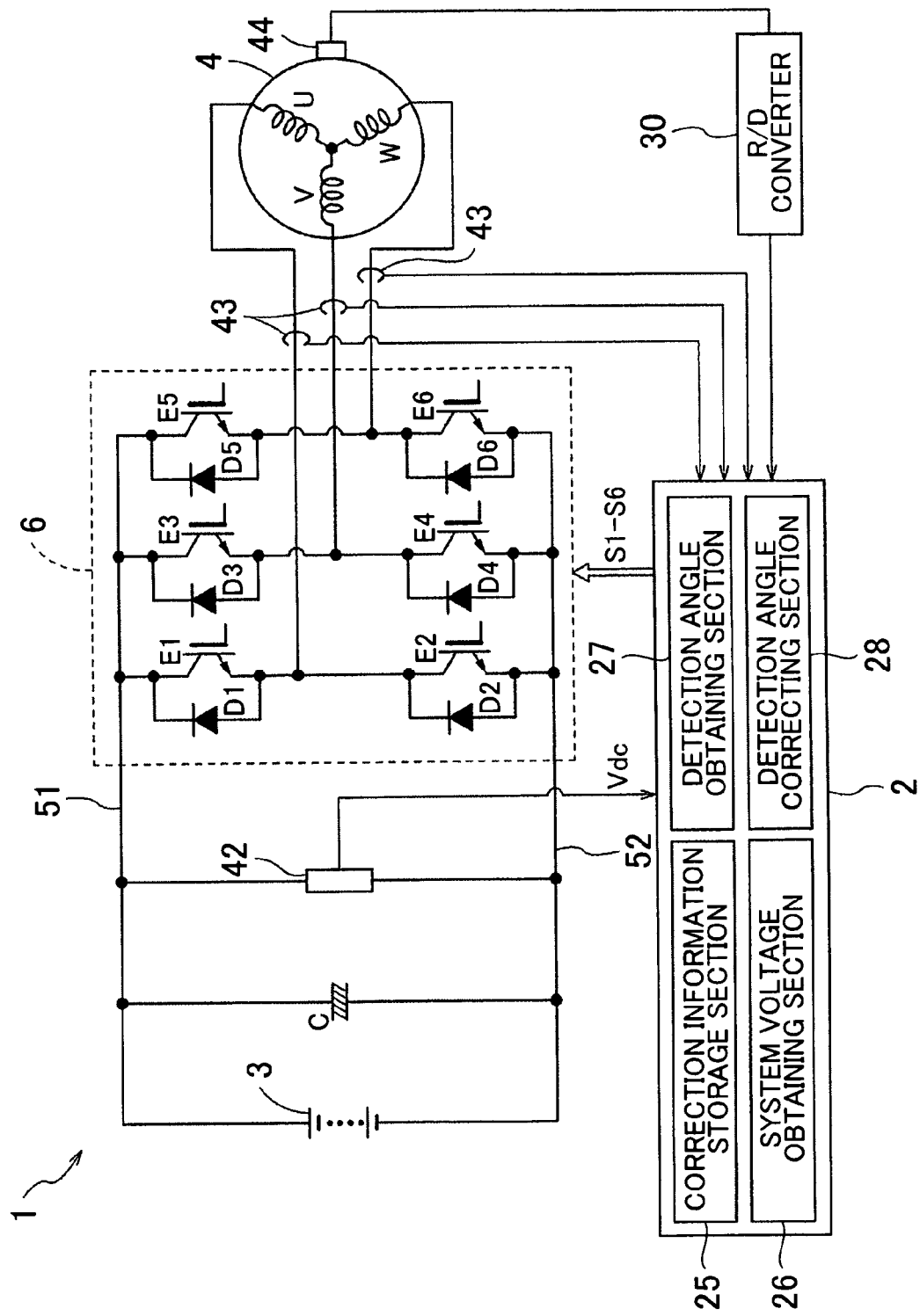
FIG. 1 is a diagram showing the structure of an electric motor drive control apparatus according to an embodiment of the present invention.

An embodiment of the present invention will be described with reference to the accompanying drawings. As shown in FIG. 1, the present embodiment will be described with respect to an example in which an electric motor drive control apparatus 1 is structured as an apparatus for driving an interior permanent magnet synchronous motor 4 (IPMSM; hereinafter simply referred to as the "electric motor" 4) which is an AC electric motor that is operated by a three-phase alternating current. The electric motor 4 is structured so as to operate also as a generator as needed, and is used as, e.g., a driving power source for electric vehicles, hybrid vehicles, and the like. The electric motor 4 is provided with a resolver 44. The resolver 44 detects the rotational position of a rotor (not shown) with respect to a stator (not shown) of the electric motor 4. Note that the "rotational position of the rotor" indicates the rotational angle of the rotor in an electrical angle. The electric motor drive control apparatus 1 is structured so as to correct a detection angle θ detected by the resolver 44, based on correction information, when controlling driving of the electric motor 4 by using the detection angle θ. The electric motor drive control apparatus 1 of the present embodiment is characterized in that the correction information is stored in association with a modulation ratio m and a system voltage Vdc, and the detection angle θ of the resolver 44 is corrected based on the correction information obtained based on the modulation ratio m and the system voltage Vdc at the time the resolver 44 obtained the detection angle θ. The electric motor drive control apparatus 1 of the present embodiment will be described in detail below.

1. Overall Structure of Electric Motor Drive Control Apparatus

First, the overall structure of the electric motor drive control apparatus 1 of the present embodiment will be described with reference to FIG. 1. The electric motor drive control apparatus 1 includes: an inverter 6 for converting a DC system voltage Vdc to an AC voltage by using the detection angle θ of the resolver 44 provided for the rotor of the electric motor 4 and supplying the AC voltage to the electric motor 4; and a control apparatus 2 for controlling switching of the inverter 6. In the present embodiment, the inverter 6 corresponds to a "DC/AC converting section" of the present invention. The electric motor drive control apparatus 1 further includes a DC power source 3 for generating the system voltage Vdc, and a smoothing capacitor C for smoothing the system voltage Vdc that is supplied from the DC power source 3. For example, various secondary batteries, such as a nickel-hydrogen secondary battery and a lithium ion secondary battery, capacitors, combinations thereof, or the like are used as the DC power source 3. In the present embodiment, a power supply voltage of the DC power source 3 is supplied as it is as the system voltage Vdc, and the system voltage Vdc is detected by a system voltage sensor 42, and is output to the control apparatus 2.

The inverter 6 is an apparatus for converting the DC system voltage Vdc to an AC voltage, and supplying the AC voltage to the electric motor 4. The inverter 6 includes a plurality of sets of switching devices E1 to E6 and diodes D1 to D6. The inverter 6 includes a pair of switching devices for each of the three phases (U-phase, V-phase, and W-phase) of the electric motor 4. More specifically, the inverter 6 includes a U-phase upper arm device E1 and a U-phase lower arm device E2, a V-phase upper arm device E3 and a V-phase lower arm device E4, and a W-phase upper arm device E5 and a W-phase lower arm device E6. In this example, insulated gate bipolar transistors (IGBTs) are used as the switching devices E1 to E6. The emitter of the upper arm device E1, E3, E5 of each phase, and the collector of the lower arm device E2, E4, E6 of each phase are connected to a coil of a corresponding phase of the electric motor 4. The collector of the upper arm device E1, E3, E5 of each phase is connected to a system voltage line 51, and the emitter of the lower arm device E2, E4, E6 of each phase is connected to a negative electrode line 52. The diodes D1 to D6, each functioning as a freewheel diode, are connected in parallel to the switching devices E1 to D6, respectively. Note that, in addition to IGBTs, power transistors of various structures, such as bipolar transistors, field effect transistors, and metal oxide semiconductor (MOS) transistors, can be used as the switching devices E1 to E6.

The switching devices E1 to D6 are respectively turned on/off according to switching control signals S1 to S6 that are output from the control apparatus 2. These switching control signals S1 to S6 are gate drive signals for driving the respective gates of the switching devices E1 to E6, respectively. Thus, the inverter 6 converts the system voltage Vdc to AC voltage, and supplies the AC voltage to the electric motor, thereby causing the electric motor 4 to output torque according to target torque. At this time, the switching devices E1 to E6 are switched on/off by pulse width modulation (PWM) control or rectangular wave control according to the switching control signals S1 to S6, respectively. In the present embodiment, as the control methods for PWM control, a sinusoidal PWM control method and an overmodulation PWM control method are provided with respect to the waveform of output voltage and switchingly executed for controlling the waveform, and a three-phase modulation control method and a two-phase modulation control method are provided with respect to the energization state of each phase and switchingly executed for controlling the energization state. On the other hand, when the electric motor 4 functions as a generator, a generated AC voltage is converted to a DC voltage, and the DC voltage is supplied to the system voltage line 51. Note that, since these control methods are known in the art, detailed description thereof will be omitted. These control methods will be described only briefly below.

In the sinusoidal PWM control, the switching devices E1 to E6 of the inverter 6 are turned on/off based on a comparison between a sinusoidal voltage command value and a carrier. More specifically, each of U, V, and W-phase output voltage waveforms of the inverter 6 is formed by a set of pulses, which is formed by high level periods during which the upper arm device E1, E3, E5 is ON, and low level periods during which the lower arm device E2, E4, E6 is ON, and the duty ratio of the pulses is controlled so that a fundamental wave component thereof becomes a sinusoidal wave in a fixed period. Provided that a modulation ratio m is the ratio of an effective value of the fundamental wave component of the output voltage waveform (the AC voltage waveform) of the inverter 6 to the system voltage Vdc, the modulation ratio m can be varied in the range of 0 to less than 0.61 in the sinusoidal PWM control.

In the overmodulation PWM control, the duty ratio of the pulses is increased on the "mountain" side of the fundamental wave component, and is reduced on the "valley" side thereof as compared to the sinusoidal PWM control, whereby the waveform of the fundamental wave component of the output voltage waveform of the inverter 6 is distorted so that the amplitude becomes larger than that in the sinusoidal PWM control. In the overmodulation PWM control, the modulation ratio m can be varied in the range of equal to or higher than 0.61 to 0.78. The overmodulation PWM control using the largest modulation ratio m of 0.78 is the rectangular wave control.

In the rectangular wave control, each of the U, V, and W-phase output voltage waveforms of the inverter 6 is controlled so as to become a rectangular wave in which one high level period and one low level period alternately appear in each cycle, and the ratio of the high level period to the low level period is 1:1. Thus, the rectangular wave control causes the inverter 6 to output a rectangular wave voltage. In the rectangular wave control, the modulation ratio m is fixed to 0.78.

In the three-phase modulation control, a PWM signal is applied to each of the U, V, and W-phases. In the present embodiment, the three-phase modulation control is performed in the range of the modulation ratio m of 0 to less than 0.61. That is, in the present embodiment, the sinusoidal PWM control is performed by the three-phase modulation control method. The sinusoidal PWM control by the three-phase modulation control method is hereinafter simply referred to as the "three-phase modulation PWM control."

In the two-phase modulation control, a PWM signal is applied to two of the U, V, and W-phases, and an ON or OFF (constant voltage) signal is applied to the remaining one phase. Switching noise, which is generated by the switching devices E1 to E6, is significantly affected by the number of switching times. Thus, the two-phase modulation control can suppress the switching noise, as compared to the three-phase modulation control. In the present embodiment, the two-phase modulation control is performed in the range of the modulation ratio m of equal to or higher than 0.61 to 0.78. That is, in the present embodiment, the overmodulation PWM control is performed by the two-phase modulation control method. The overmodulation PWM control by the two-phase modulation control method is hereinafter simply referred to as the "two-phase modulation PWM control."

As described above, in the present embodiment, the inverter 6 is structured so as to be able to switch among a plurality of control methods that use different switching methods for conversion from each other (in this example, the three-phase modulation PWM control method, the two-phase modulation PWM control method, and the rectangular wave control method).

The respective current values of the U, V, and W-phases, and the rotational position (the electrical angle) of the rotor of the electric motor 4 are applied to the control apparatus 2. The control apparatus 2 controls the inverter 6 based on these information, the torque required for the electric motor 4, and the like, thereby controlling driving of the electric motor 4. The respective current values of the U, V, and W-phases, each flowing between the inverter 6 and the coil of a corresponding phase of the electric motor 4, are detected by a current sensor 43, and are output to the control apparatus 2. Note that FIG. 1 shows an example in which the respective current values of the U, V, and W-phases are detected by the current sensor 4. However, the respective currents of the three phases are in an equilibrium state, and the sum of these currents is zero. Thus, the current values of two of the three phases may be detected by the current sensor 43, and the current of the remaining one phase may be obtained by computation. The rotation position (the electrical angle) of the rotor of the electric motor 4 at each time point is detected by the resolver 44, and is output to the control apparatus 2.

The resolver 44 is placed adjacent to the rotor of the electric motor 4, and is provided to detect the rotational position (the electrical angle) of the rotor with respect to the stator of the electric motor 4, and the rotational speed of the rotor. The resolver 44 has a sensor rotor (not shown) and a sensor stator (not shown), and is structured so that the sensor rotor rotates integrally with the rotor of the electric motor 4. Thus, the rotational position (the electrical angle) of the rotor of the electric motor 4 can be detected by processing a detection signal of the resolver 44. An output signal of the resolver 44 is converted to output signals of three phases, which are an A-phase signal, a B-phase signal, and a Z-phase signal, by a resolver/digital (R/D) converter 30, and the A-phase signal, the B-phase signal, and the Z-phase signal are output to the control apparatus 2.

2. Structure of Each Part of Control Apparatus

The structure of each part of the control apparatus 2 according to the present embodiment will be described in detail below. As shown in FIG. 1, the control apparatus 2 includes a detection angle obtaining section 27, a detection angle correcting section 28, and a system voltage obtaining section 26. Each of these functional parts of the control apparatus 2 is structured by one or both of hardware and software (a program) for performing various processing of input data, and uses a logic circuit such as a microcomputer as a core part. The control apparatus 2 further includes a correction information storage section 25. The correction information storage portion 25 includes a recording medium capable of storing information or capable of storing and rewriting information, such as, e.g., a hard disk drive and a flash memory, as a hardware configuration. Each functional part of the control apparatus 2 will be described in detail below.

2-1. Detection Angle Obtaining Section

The detection angle obtaining section 27 is a functional part for obtaining the detection angle θ of the resolver 44. As described above, the output signals of three phases (the A-phase signal, the B-phase signal, and the Z-phase signal) are applied from the R/D converter 30 to the control apparatus 2. In the present embodiment, the detection angle obtaining section 27 is structured so as to obtain the detection angle θ of the resolver 44 by calculating the detection angle θ based on these output signals. The detection angle θ obtained by the detection angle obtaining section 27 is output to the detection angle correcting section 28.

Figure 2:
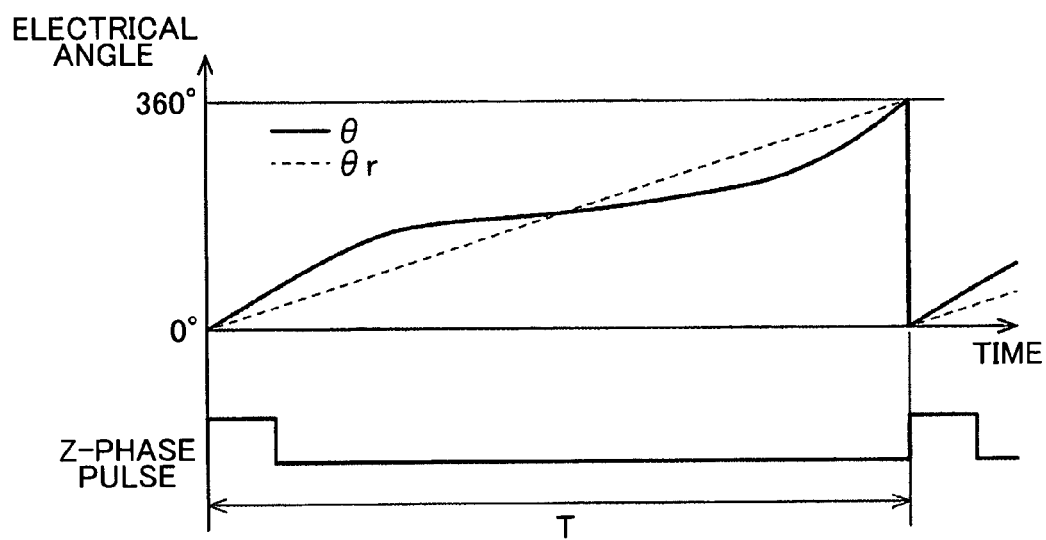
FIG. 2 is a diagram illustrating a detection angle of a resolver, and an error of the detection angle.

The procedures for calculating the detection angle θ of the resolver 44, which are performed by the detection angle obtaining section 27, will be described below with reference to FIG. 2. In order to simplify the description, it is herein assumed that one rotation of the sensor rotor of the resolver 44 corresponds to the electrical angle of 360°. However, the detection angle θ can be similarly calculated even when one rotation of the sensor rotor corresponds to an integral multiple of (e.g., two times, four times, or the like) 360° of the electrical angle. FIG. 2 schematically shows the state where the rotor of the electric motor 4 is rotating at a constant speed. As described above, the output signal of the resolver 44 is converted to the output signals of the three phases (the A-phase signal, the B-phase signal, and the Z-phase signal) by the R/D converter 30, and these output signals are applied to the detection angle obtaining section 27. As shown in FIG. 2, the Z-phase signal is a signal including pulses that are generated every time the sensor rotor of the resolver 44 makes one rotation (hereinafter referred to as the "Z-phase pulse signal"). That is, the Z-phase pulse signal is a signal including pulses that are generated at predetermined control intervals T, where the control interval T is a time period it takes for the sensor rotor of the resolver 44 to make one rotation. The electrical angle of the resolver 44 is determined by using the rising point of a pulse in the Z-phase pulse signal as a reference point (a zero point). More specifically, the electrical angle is determined by using the rising point of one rectangular pulse in the Z-phase pulse signal as "0°," and using the rising point of the subsequent rectangular pulse in the Z-phase pulse signal as "360°."

Although not shown in the drawing, the A-phase signal and the B-phase signal are rectangular wave signals including pulses that are generated at very short predetermined intervals. The A-phase signal and the B-phase signal have a predetermined phase difference (e.g., a phase difference of) 90° from each other. The A-phase signal and the B-phase signal are designed so as to include a predetermined number of pulses in each period (the control interval T) of the Z-phase pulse signal. Thus, the rotational position (the electrical angle) at each time point can be obtained by counting the number of pulses that have appeared in the A-phase signal and the B-phase signal during a period from the reference point (the zero point) of the Z-phase signal to that time point. For example, in the case where each of the A-phase signal and the B-phase signal includes 1,024 pulses during the control interval T, and n pulses have appeared in the A-phase signal and the B-phase signal during a period from the reference point (the zero point) of the Z-phase pulse signal to a certain time point, the rotational position (the rotational phase) at that time point corresponds to an electrical angle of "(360°/1,024)×n." Note that, since the A-phase signal and the B-phase signal have a predetermined phase difference from each other, the rotational direction of the rotor of the electric motor 4 can be determined based on the order in which these signals are output.

The detection angle obtaining section 27 calculates the electrical angle of the sensor rotor of the resolver 44 by counting the number of pulses included in the A-phase signal and the B-phase signal as described above. In this example, the zero point of the electrical angle of the resolver 44 and the zero point of the electrical angle of the electric motor 4 are set to be equal to each other. Thus, the electrical angle of the sensor rotor of the resolver 44 is equal to the electrical angle of the rotor of the electric motor 4.

FIG. 2 shows an example of the detection angle θ of the resolver 44 calculated as described above by the detection angle obtaining section 27. Broken line in FIG. 2 indicates a true electrical angle θr of the sensor rotor of the resolver 44 (hereinafter simply referred to as the "true electrical angle θr") in this case. As described above, this example indicates the state where the rotor of the electric motor 4 is rotating at a constant speed. Thus, the true electrical angle θr increases uniformly with time, and is represented by straight line as shown in FIG. 2. Note that the detection angle θ typically has an error. In the example of FIG. 2, the detection angle θ is larger than the true electrical angle θr by a certain time point in the control interval T, and is smaller than the true electrical angle θr after that time point.

Such an error of the detection angle θ includes an error resulting from the structure and characteristics of the resolver 44, and an error resulting from the surrounding environment of the resolver 44. The error resulting from the structure and characteristics of the resolver 44 includes, e.g., an error resulting from uneven winding of the coil of the resolver 44. The error resulting from the surrounding environment of the resolver 44 includes, e.g., an error resulting from electric or magnetic noise generated by the switching devices E1 to E6 of the inverter 6 (hereinafter simply referred to as the "switching noise"), an error resulting from a leakage magnetic flux from the electric motor 4. For example, the error resulting from the switching noise is generated when magnetic noise generated by the switching devices E1 to E6 reaches the resolver 44 and affects the output signal from the resolver 44. The error resulting from the switching noise can also be generated when the magnetic noise generated by the switching devices E1 to E6 reaches any position in a signal path from the resolver 44 via the R/D converter 30 to the control apparatus 2, and affects a signal that flows in a device or a wiring located at that position. The electric motor drive control apparatus 1 of the present invention can appropriately correct such an error resulting from the switching noise as described below.

Note that, in the above example, the output signals of the three phases (the A-phase signal, the B-phase signal, and the Z-phase signal) are applied from the R/D converter 30 to the detection angle obtaining section 27, and the detection angle obtaining section 27 calculates the detection angle θ of the resolver 44 based on these output signals. However, for example, it is also preferable that the R/D converter 30 or an apparatus provided together with the R/D converter 30 calculate the detection angle θ of the resolver 44, and the detection angle obtaining section 27 obtain the calculated detection angle θ.

2-2. System Voltage Obtaining Section

The system voltage obtaining section 26 is a functional part for obtaining the system voltage Vdc. In the present embodiment, the system voltage Vdc is the power supply voltage that is supplied as it is from the DC power source 3. The power supply voltage of the DC power source 3 typically varies according to the amount of charging called the "state of charge (SOC)". Thus, the system voltage Vdc also varies according to the SOC. The system voltage Vdc is detected by the system voltage sensor 42, and is output to the control apparatus 2. The system voltage obtaining section 26 is structured so as to obtain the system voltage Vdc applied to the control apparatus 2. The system voltage Vdc obtained by the system voltage obtaining section 26 is output to the detection angle correcting section 28.

2-3. Correction Information Storage Section

The correction information storage section 36 is a functional part for storing correction information for correcting the detection angle θ of the resolver 44, in association with the modulation ratio m. Note that the reason why the correction information is stored in association with the modulation ratio m is that, if the modulation ratio m is the same, the state where the switching noise, which affects the detection signal of the resolver 44, is generated becomes similar even if the operating point of the electric motor 4 defined by the torque and the rotational speed is different. Thus, when correcting the detection angle θ of the resolver 44, the operating state of the electric motor 4 can be divided into a plurality of operating states in a simple manner according to the modulation ratio m, instead of according to the torque and the rotational speed. Thus, the detection angle θ can be appropriately corrected by using the correction information corresponding to the modulation ratio m. Note that, in the present embodiment, the correction information storage section 25 stores the correction information for correcting the detection angle θ of the resolver 44, in association with the system voltage Vdc as well. However, the correction information associated with the modulation ratio m will be described first on the assumption that the system voltage Vdc is constant. The correction information associated with the system voltage Vdc will be described later.

In the present embodiment, the correction information storage section 25 stores correction value maps for a plurality of modulation ratio ranges, respectively. The plurality of modulation ratio ranges are determined by dividing a possible value range of the modulation ratio m into a plurality of regions, and each correction value map defines a correction value Δθ with respect to the detection angle θ of the resolver 44. Each correction value map includes information for correcting an error of the detection angle θ of the resolver 44, which increases with an increase in switching noise of the switching devices E1 to E6 of the inverter 6. The correction value maps stored in the correction information storage section 25 will be described below with reference to FIG. 3. Note that, in the present embodiment, the correction value maps correspond to "correction information" in the present invention.

Figure 3:
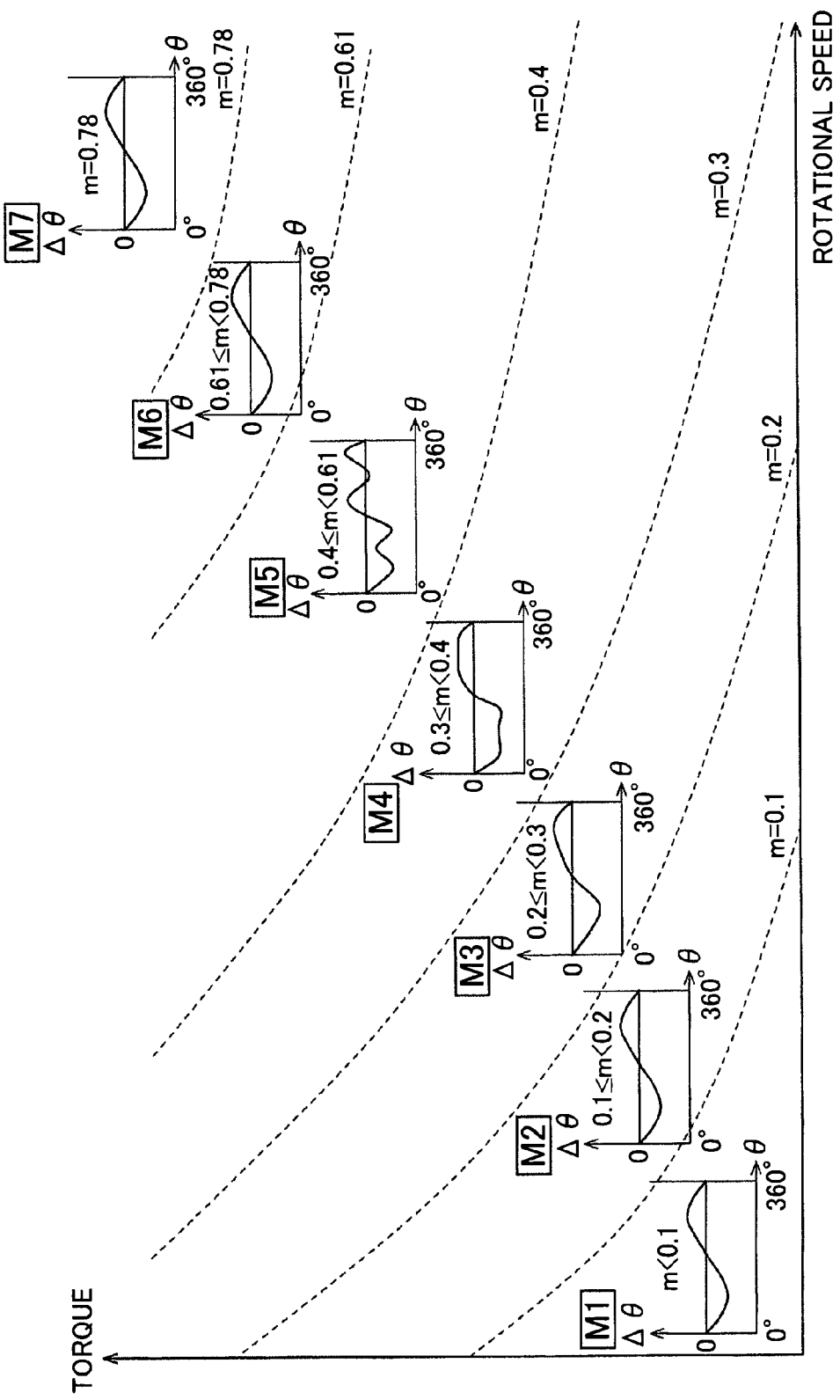
FIG. 3 is a diagram conceptually showing correction value maps stored in a correction information storage section according to the embodiment of the present invention.

FIG. 3 is a graph conceptually showing the modulation ratio ranges, and the correction value maps respectively assigned to the modulation ratio ranges. In the graph, the abscissa indicates the rotational speed, and the ordinate indicates the torque. These correction value maps are correction information associated with a specific system voltage Vdc (or a specific system voltage range). Broken lines in FIG. 3 indicate equal modulation ratio curves connecting those operating points that have the same modulation ratio m. In the present embodiment, as shown in FIG. 3, seven modulation ratio ranges are determined by dividing a possible value range of the modulation ratio into seven regions. More specifically, these seven modulation ratio ranges are: a region where the modulation ratio m is less than 0.1 (hereinafter referred to as the "first modulation ratio range"); a region where the modulation ratio m is 0.1 or more and less than 0.2 (hereinafter referred to as the "second modulation ratio range"); a region where the modulation ratio m is 0.2 or more and less than 0.3 (hereinafter referred to as the "third modulation ratio range"); a region where the modulation ratio m is 0.3 or more and less than 0.4 (hereinafter referred to as the "fourth modulation ratio range"); a region where the modulation ratio m is 0.4 or more and less than 0.61 (hereinafter referred to as the "fifth modulation ratio range"); a region where the modulation ratio m is 0.61 or more and less than 0.78 (hereinafter referred to as the "sixth modulation ratio range"); and a region where the modulation ratio m is equal to 0.78 (hereinafter referred to as the "seventh modulation range"). Note that a method of determining the modulation ratio ranges is not limited to this, and the number of modulation ratio ranges, and the values of the modulation ratio m which define the boundaries between the modulation ratio ranges can be changed as appropriate. For example, for those regions where a change in modulation ratio m significantly changes the state where the switching noise, which affects the detection signal of the resolver 44, is generated, it is preferable to determine the two values of the modulation ratio m which define the boundary of the modulation ratio range so that the difference between the values becomes small.

In the present embodiment, the modulation ratio ranges are determined as described above, a switch point between the three-phase modulation PWM control method and the two-phase modulation PWM control method is equal to the boundary between the fifth modulation ratio range and the sixth modulation ratio range, and a switch point between the two-phase modulation PWM control method and the rectangular wave control method is equal to the boundary between the sixth modulation ratio range and the seventh modulation ratio range. Thus, in the present embodiment, the correction information is stored in association with the modulation ratios m, whereby the correction information is also stored in association with the control methods of the inverter 6.

As conceptually shown in FIG. 3, the correction value maps are respectively assigned to the seven modulation ratio ranges determined as described above. More specifically, a first correction value map M1 is assigned to the first modulation ratio range, a second correction value map M2 is assigned to the second modulation ratio range, a third correction value map M3 is assigned to the third modulation ratio range, a fourth correction value map M4 is assigned to the fourth modulation ratio range, a fifth correction value map M5 is assigned to the fifth modulation ratio range, a sixth correction value map M6 is assigned to the sixth modulation ratio range, and a seventh correction value map M7 is assigned to the seventh modulation ratio range. Each of these correction value maps M1 to M7 is a map that defines the correction value Δθ with respect to the detection angle θ of the resolver 44. For illustration, each of such correction value maps is shown by a graph in which the abscissa indicates the detection angle θ, and the ordinate indicates the correction value Δθ. Note that the graphs respectively showing the correction value maps were produced based on the results of the tests actually conducted by the inventors.

The first correction value map M1 shown in FIG. 3 is substantially the same as a correction value map (not shown) for correcting the detection angle θ of the resolver 44 in the case where there is no error resulting from the switching noise, but there is only an error resulting from the structure and characteristics of the resolver 44. That is, in this example, the influence of the switching noise on the detection signal of the resolver 44 decreases in the first modulation ratio range that uses the first correction value map M1.

On the other hand, FIG. 3 shows that the respective waveforms of the second correction value map M2, the third correction value map M3, the fourth correction value map M4, and the fifth correction value map M5 are distorted to a greater or lesser extent, as compared to the waveform of the first correction value map M1. Such distortion of the waveforms indicates that the influence of the switching noise on the detection signal of the resolver 44 increases in the second modulation ratio range, the third modulation ratio range, the fourth modulation ratio range, and the fifth modulation ratio range, which respectively use these correction value maps, as compared to the first modulation ratio range. Comparison among the second correction value map M2, the third correction value map M3, the fourth correction value map M4, and the fifth correction value map M5 shows that the waveform deformation increases with an increase in modulation ratio m.

The sixth correction value map M6 and the seventh correction value map M7 are substantially the same as the first correction value map M1. That is, in this example, the influence of the switching noise on the output signal of the resolver 44 decreases in the sixth modulation ratio range that uses the sixth correction value map M6, and the seventh modulation ratio range that uses the seventh correction value map M7.

As described above, the waveform of the correction value map changes according to the modulation ratio m, and the distortion of the waveform increases as the modulation ratio m increases from 0 toward 0.61. This is because, as the modulation ratio m increases from 0 toward 0.61, the on/off timing of the switching devices E1 to E6 changes, and the influence of the switching noise on the detection value of the resolver 44 increases. On the other hand, the distortion of the waveform decreases when the modulation ratio m equals to or exceeds 0.61. This is because, in the region where the modulation ratio m is equal to or higher than 0.61, the two-phase modulation PWM control and the rectangular wave control are performed, and thus, the number of times the switching devices E1 to E6 are turned on/off is suppressed, reducing the influence of the switching noise on the detection value of the resolver 44. As described above, the correction value maps include information for correcting an error of the detection angle θ of the resolver 44, which increases with an increase in switching noise of the switching devices E1 to E6 of the inverter 6. Thus, an error resulting from the switching noise can be appropriately corrected.

Note that such correction value maps can be produced by tests, simulations, and the like, and can be stored in, e.g., the correction information storage section 25 when manufacturing the electric motor drive control apparatus 1. The procedures for producing the correction value maps by the tests will be described below with reference to FIG. 4.

Figure 4:
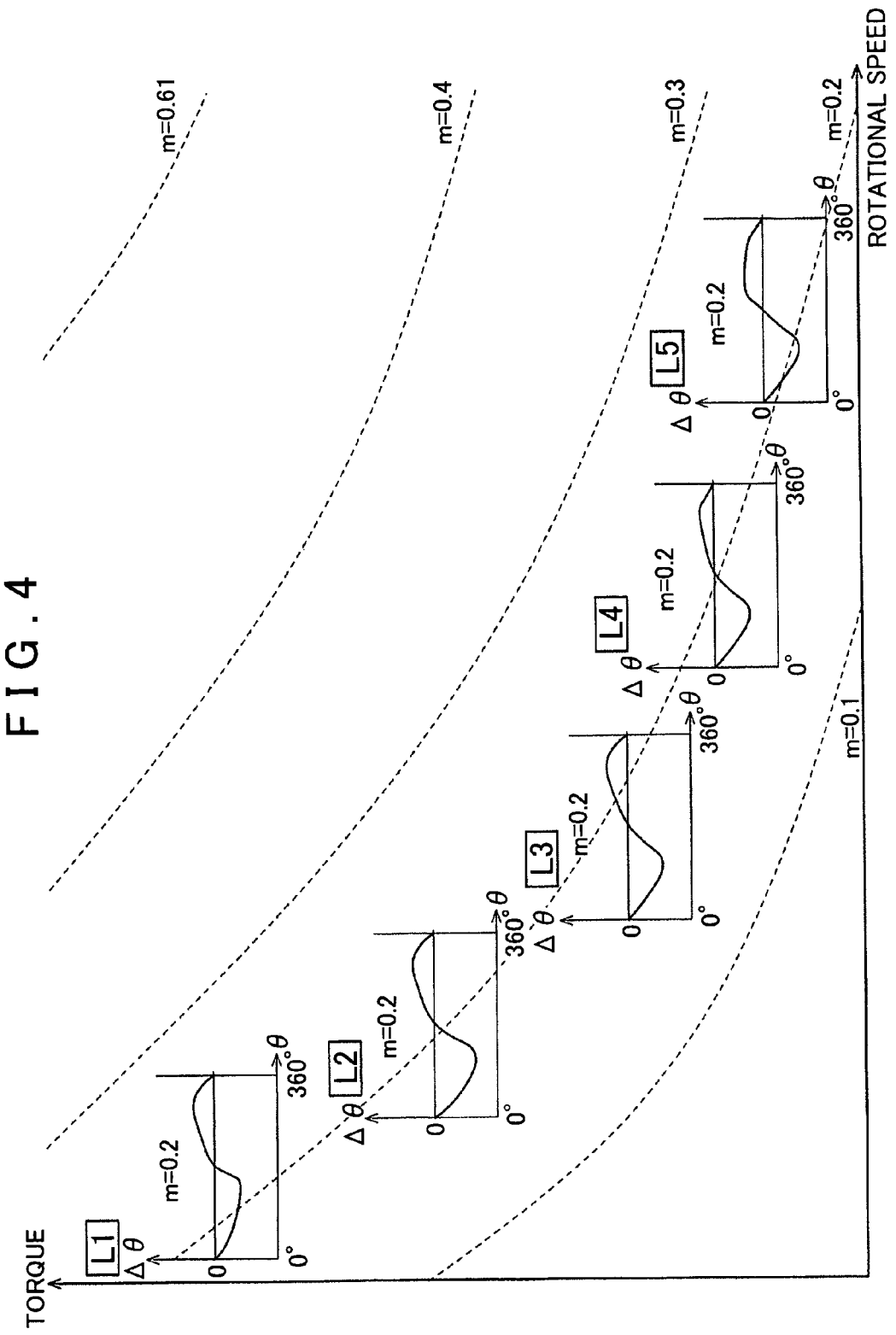
FIG. 4 is a diagram schematically showing a plurality of test results for the same modulation ratio.

FIG. 4 is a graph showing the result of the tests for producing the correction value maps. In the graph, the abscissa indicates the rotational speed, and the ordinate indicates the torque. Broken lines in FIG. 4 indicate equal modulation ratio curves connecting those operating points that have the same modulation ratio m. Graphs (test results L1 to L5), shown along the equal modulation ratio curve corresponding to the modulation ratio m of "0.2," respectively show the test results of the correction value Δθ at five operating points where the modulation ratio m is the same ("0.2" in this example), and the rotational speed and the torque are different from each other. Note that the test results L1 to L5 are produced based on the results of the tests actually conducted by the inventors. Note that such tests are conducted in the state where the true electrical angle θr of the sensor rotor of the resolver 44 between Z-phase pulses is obtained, such as when the rotor of the electric motor 4 is rotating at a constant speed as shown in, e.g., FIG. 2, or when the rotational speed of the rotor of the electric motor 4 is increasing or decreasing at a constant rate. The correction value Δθ for the detection angle θ of the resolver 44 obtained by the tests can be obtained by comparing the detection angle θ with the true electrical angle θr. In FIG. 4, the correction value Δθ obtained in this manner is shown by graphs, where the abscissa indicates the detection angle θ, and the ordinate indicates the correction value Δθ, as in the case of the above correction value maps.

As shown in FIG. 4, if the modulation ratio m is the same, the graphs showing the correction value $\Delta\theta$ become similar, although not identical, even if the rotational speed and the torque are different. This indicates that, if the modulation ratio m is the same, the states of the switching noise that affects the detection signal of the resolver 44 become similar even if the rotational speed and the torque are different. Note that, although not shown in the figure, the inventors conducted the tests with the rotational speed and the torque being varied at the modulation ratio m other than "0.2." As a result, the inventors have confirmed in the entire possible value range of the modulation ratio m that, if the modulation ratio m is the same, the graphs showing the correction value $\Delta\theta$ become similar, although not identical, even if the rotational speed and the torque are different.

By using the test results for the same modulation ratio m obtained as described above, an average value of the correction values $\Delta\theta$ is calculated for every detection angle $\theta$, whereby a correction value map corresponding to that modulation ratio m is produced. Note that, in the present embodiment, the seven modulation ratio ranges are determined as described above, and when producing the correction value maps, an average value of the correction values $\Delta\theta$ is calculated for every detection angle $\theta$ by using the test results for the modulation ratio m included in these modulation ratio ranges. For example, the correction values $\Delta\theta$ obtained based on the test results L1 to L5 for the modulation ratio m of 0.2 shown in FIG. 4 are used to produce the third correction value map M3 in FIG. 3. Note that, although an example of producing the correction value maps by the tests is described above, the correction value maps can be produced by simulations by using a similar method.

Further, it may be structured that the correction information is learnt during operation of the electric motor drive control apparatus 1 so as to update the correction value maps prestored in the correction information storage section 25, or so as to produce new correction value maps. That is, as described above, when the electric motor 4 is operating in the state where the true electrical angle $\theta r$ of the sensor rotor of the resolver 44 is obtained, the correction value $\Delta\theta$ can be obtained by comparing the detection angle $\theta$ of the resolver 44 and the true electrical angle $\theta r$. For example, if the electric motor 4 is provided as a driving power source in an electric vehicle, a hybrid vehicle, or the like, the true electrical angle $\theta r$ between the Z-phase pluses is obtained when the vehicle is running at a constant speed, when the vehicle speed is changing at a constant acceleration or deceleration, and the like. When the electric motor 4 is operating in such a state, the correction value $\Delta\theta$ is obtained in a manner similar to that of the above tests, whereby the correction value map corresponding to the modulation ratio m at the time the correction value $\Delta\theta$ was obtained can be updated, or a new correction value map can be produced. Such a structure of learning the correction information during operation of the electric motor drive control apparatus 1 is especially effective in the case where, e.g., parts of the resolver 44, the R/D converter 30, the control apparatus 2, and the like are subjected to aging degradation or the like.

In the present embodiment, the correction information storage section 25 stores the correction information in association with the system voltage Vdc, in addition to with the modulation ratio m. That is, the correction information storage section 25 has such a plurality of correction value maps as conceptually shown in FIG. 3, in association with the system voltage Vdc. Note that the reason why the correction information is stored in association with the system voltage Vdc is that, if the system voltage Vdc is different, the amount of switching noise that is generated is different, and thus, the influence of the switching noise on the detection signal of the resolver 44 is different, even if the on/off timing of the switching devices E1 to E6 is the same.

Figures 5, 6:
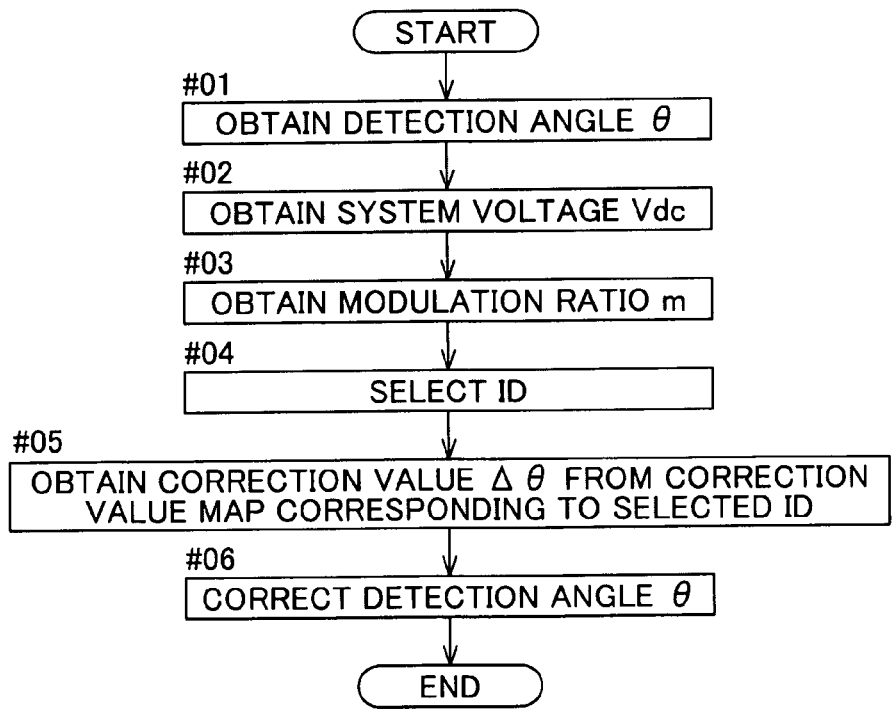
FIG. 5 is a diagram showing the relation among a system voltage, a modulation ratio, and an ID associated with each correction value map.
FIG. 6 is a flowchart illustrating procedures for correcting a detection angle according to the embodiment of the present invention.

In the present embodiment, a possible value range of the system voltage Vdc is divided into a plurality of regions to determine a plurality of system voltage ranges. FIG. 5 shows a part of the determined plurality of system voltage ranges by way of example. The seven modulation ratio ranges are provided for each system voltage range, and a unique identification (ID) is assigned to each operating state of the electric motor 4 which is determined by the system voltage range and the modulation ratio range. Each ID is associated with a corresponding one of the correction value maps, and the detection angle correction portion 28 described below is structured so as to obtain a necessary correction value $\Delta\theta$ by selecting an ID corresponding to the operating state of the electric motor 4 (in this example, the modulation ratio m and the system voltage Vdc) at the time the detection angle obtaining section 27 obtained the detection angle $\theta$, and obtaining a correction value map associated with the ID.

Note that, in this example, seven modulation ratio ranges are provided for each system voltage range. However, a plurality of (e.g., seven) modulation ratio ranges may be provided for each of a plurality of system voltages Vdc that are provided at predetermined intervals. In this case, if the system voltage Vdc at the time the detection angle obtaining section 27 obtained the detection angle $\theta$ does not match any of the system voltages Vdc provided at predetermined intervals, the detection angle correcting section 28 described below can obtain a correction value $\Delta\theta$ by linear interpolation or the like by using a correction value map corresponding to a system voltage Vdc having a value close to that system voltage Vdc, or by using correction value maps respectively corresponding to a plurality of (e.g., two) system voltages Vdc each having a value close to that system voltage Vdc.

2-4. Detection Angle Correcting Section

The detection angle correcting section 28 is a functional part for obtaining correction information from the correction information storage section 25, based on the modulation ratio m and the system voltage Vdc at the time the detection angle obtaining section 27 obtained the detection angle $\theta$ of the resolver 44, and correcting the detection angle $\theta$ of the resolver 44 based on the correction information. As described above, the detection angle $\theta$ of the resolver 44 obtained by the detection angle obtaining section 27, and the system voltage Vdc obtained by the system voltage obtaining section 26 are applied to the detection angle correcting section 28. The detection angle correcting section 28 is structured so as to obtain the modulation ratio m. Thus, the detection angle correcting section 28 obtains the detection angle $\theta$ of the resolver 44, the modulation ratio m at the time the detection angle obtaining section 27 obtained the detection angle $\theta$, and the system voltage Vdc at the time the detection angle obtaining section 27 obtained the detection angle $\theta$.

The detection angle correcting section 28 obtains correction information from the correction information storage portion 25, based on the obtained system voltage Vdc and the obtained modulation ratio m. In the present embodiment, as described above, correction value maps including correction information are stored for every system voltage range so as to respectively correspond to the modulation ratio ranges provided for that system voltage range. Thus, in the present embodiment, the detection angle correcting section 28 obtains correction information for correcting the detection angle $\theta$ of the resolver 44, from a correction value map corresponding to such a modulation ratio range that corresponds to a system voltage range including the system voltage Vdc at the time the detection angle obtaining section 27 obtained the detection angle θ of the resolver 44, and that includes the modulation ratio m at the time the detection angle obtaining section 27 obtained the detection angle θ of the resolver 44. More specifically, as shown in FIG. 5, the detection angle correcting section 28 selects an ID corresponding to the operating state based on the system voltage Vdc and the modulation ratio m, obtains a correction value Δθ from the correction value map corresponding to the selected ID, and corrects the detection angle θ. In the present embodiment, the correction value Δθ is defined so as to have a negative value when the detection angle θ is larger than the true electrical angle θr. Thus, a corrected detection angle θc can be obtained by adding the correction value Δθ to the detection angle θ.

3. Procedures for Correcting the Detection Angle

Procedures for correcting the detection angle (a method for correcting the detection angle), which are performed in the electric motor drive control apparatus 1 of the present embodiment, will be described below with reference to FIG. 6. The procedures for correcting the detection angle described below are performed by one or both of hardware and software (programs) of the functional parts (the detection angle obtaining portion 27, the system voltage obtaining portion 26, and the detection angle correcting portion 28) of the control apparatus 2 described above. In the case where these functional parts are formed by programs, a processor included in the control apparatus 2 operates as a computer for executing the programs of the functional parts.

First, the detection angle obtaining section 27 obtains the detection angle θ of the resolver 44 (step #01), the system voltage obtaining section 26 obtains the system voltage Vdc (step #02), and the detection angle correcting section 28 obtains the modulation ratio m (step #03). Since the information regarding the detection angle θ and the system voltage Vdc is sent to the detection angle correcting section 28, the detection angle correcting section 28 can obtain the detection angle θ of the resolver 44, the modulation ratio m at the time the detection angle obtaining section 27 obtained the detection angle θ, and the system voltage Vdc at the time the detection angle obtaining section 27 obtained the detection angle θ. The detection angle correcting section 28 selects an ID corresponding to the operating state, based on the system voltage Vdc and the modulation ratio m (step #04), and obtains a correction value Δθ from a correction value map corresponding to the selected ID (step #05). Then, the detection angle correcting section 28 adds the correction value Δθ to the detection angle θ to correct the detection angle θ (step #06).

Note that the procedures for correcting the detection angle are not limited to those performed in the order shown in FIG. 6, and it is also preferable to perform step #01 between steps #04 and #05. In this case, it is preferable to select an ID according to the operating state of the electric motor 4 (in this example, the modulation ratio m and the system voltage Vdc) in advance (steps #02, #03, and #04), and to repeatedly perform steps #01, #05, and #6 without performing steps #02, #03, and #04, unless the operating state changes to such a degree that the ID needs to be changed.

4. Other Embodiments (1) The above embodiment is described with respect to an example in which correction information is the correction value maps defining the correction value Δθ for the detection angle θ. However, embodiments of the present invention are not limited to this. For example, it is also one of preferred embodiments of the present invention that the correction value maps define a correction value for a pulse count value that indicates the number of pulses included in the A-phase signal and the B-phase signal that are output from the R/D converter 30, and an electrical angle be calculated by using a corrected pulse count value.

(2) The above embodiment is described with respect to an example in which the correction information is the correction value maps stored respectively corresponding to the plurality of modulation ratio ranges that are determined by dividing a possible value range of the modulation ratio m into a plurality of regions. However, embodiments of the present invention are not limited to this. For example, it is also one of preferred embodiments of the present invention that the correction value maps be stored respectively corresponding to a plurality of modulation ratios m that are provided at predetermined intervals (e.g., 0.01, 0.05, 0.1, or the like) therebetween, instead of corresponding to the modulation ratio ranges. In this case, it may be structured that, if the modulation ratio m at the time the detection angle obtaining section 27 obtained the detection angle θ does not match any of these modulation ratios m provided at predetermined intervals, the detection angle correcting section 28 obtains a necessary correction value Δθ by linear interpolation or the like by using a correction value map corresponding to a modulation ratio m having a value close to that modulation ratio m, or by using correction value maps respectively corresponding to a plurality of (e.g., two) modulation ratios m having a value close to that modulation ratio m. Note that the predetermined intervals need not necessarily be a fixed value. It is preferable to reduce the predetermined intervals in such a region that a change in modulation ratio m significantly changes the state where the switching noise, which affects the detection signal of the resolver 44, is generated.

(3) The above embodiment is described with respect to an example in which the correction information includes information for correcting an error of the detection angle θ, which increases with an increase in switching noise of the switching devices E1 to E6. However, embodiments of the present invention are not limited to this. It is also one of preferred embodiments of the present invention that the correction information further include information for correcting an error of the detection angle θ due to the temperature of the resolver 44, aging degradation of the resolver 44 and the R/D converter 30, a leakage magnetic flux from the electric motor 4, and the like. In the case where the zero point of the electrical angle of the resolver 44 and the zero point of the electrical angle of the electric motor 4 are not equal to each other, it is preferable that the correction information further include correction information for correcting these zero points.

(4) The above embodiment is described with respect to an example in which the correction information is stored in association with the system voltage Vdc as well. However, embodiments of the present invention are not limited to this. It is also preferable that the correction information be stored in association with only the modulation ratio m, and the detection angle correcting section 28 obtain the correction information based only on the modulation ratio m at the time the detection angle obtaining section 27 obtained the detection angle θ, and correct the detection angle θ based on the obtained correction information. This structure is preferably used in the case where the system voltage Vdc changes only by a small amount, and in the case where the state where the switching noise, which affects the detection signal of the resolver 44, is generated does not depend on the system voltage Vdc so much.

(5) The above embodiment is described with respect to an example in which the correction information is stored in association with the control method of the inverter 6 as well, as a consequence of storing the correction information in association with the modulation ratio m. However, embodiments of the present invention are not limited to this. For example, it is also, one of preferred embodiments of the present invention that; in the case where the boundary between the modulation ratio ranges does not match the boundary where the control method is switched, or the like, the correction information storage section 25 store the correction information in association with the control method as well, and the detection angle correcting section 28 obtain the correction information based on the control method at the time the detection angle obtaining section 27 obtained the detection angle θ. Note that it is also preferable not to store the correction information in association with the control method, in the case where the state where the switching noise, which affects the detection signal of the resolver 44, is generated does not depend on the control method so much, and in the case where the control method is not switched.

(6) The above embodiment is described with respect to an example in which the boundary where the control method is switched between the two-phase modulation control method and the three-phase modulation control method matches the boundary where the control method is switched between the sinusoidal PWM control method and the overmodulation PWM control method. However, embodiments of the present invention are not limited to this, and it is also preferable that these boundaries do not match each other. In this structure, in the case where the correction information storage section 25 stores the correction information in association with the control method as well, it is preferable to store the correction information in association with both the group of the control methods relating to the output voltage waveform, such as the sinusoidal PWM control method, the overmodulation PWM control method, and the rectangular wave control method, and the group of the control methods relating to the energization state of each phase, such as the two-phase modulation control method and the three-phase modulation control method.

(7) The above embodiment is described with respect to an example in which the power supply voltage of the DC power source 3 is supplied as it is as the system voltage Vdc. However, embodiments of the present invention are not limited to this. For example, it is also one of preferred embodiments of the present invention that the electric motor drive control apparatus 1 include a converter for increasing or decreasing the power supply voltage of the DC power source 3, and the output of the converter be supplied as the system voltage Vdc.

(8) The above embodiment is described with respect to an example in which the AC electric motor (the electric motor 4) is an interior permanent magnet synchronous motor (IPMSM) that is operated by a three-phase alternating current. However, embodiments of the present invention are not limited to this. For example, a surface permanent magnet synchronous motor (SPMSM) may be used as the AC electric motor. Alternatively, an electric motor other than the synchronous electric motors, such as, e.g., an induction electric motor, can be used as the AC electric motor. A multi-phase alternating current other than the three-phase alternating current, such as a two-phase alternating current or a four-phase or more alternating current, may be used as an alternating current that is supplied to such an AC electric motor.

The present invention can be preferably used for electric motor drive control apparatuses including a DC/AC converting section that converts a DC system voltage to an AC voltage by using a detection angle of a resolver provided for a rotor of an AC electric motor, and supplies the AC voltage to the AC electric motor.

What is claimed is:

1. An electric motor drive control apparatus including a DC/AC converting section that converts a DC system voltage to an AC voltage by using a detection angle of a resolver provided for a rotor of an AC electric motor, and supplies the AC voltage to the AC electric motor, the electric motor drive control apparatus comprising:
   a detection angle obtaining section that obtains the detection angle of the resolver;
   a correction information storage section that stores correction information for correcting the detection angle, in association with a modulation ratio that is a ratio of an effective value of a fundamental wave component of the AC voltage to the system voltage; and
   a detection angle correcting section that obtains the correction information from the correction information storage section, based on the modulation ratio at the time the detection angle obtaining section obtains the detection angle, and corrects the detection angle based on the correction information, wherein
   the correction information stored in the correction information storage section includes information for correcting an error of the detection angle, which increases with an increase in switching noise of a switching device included in the DC/AC converting section.

2. The electric motor drive control apparatus according to claim 1, wherein
   the correction information storage section stores a correction value map, which defines a correction value for the detection angle, for each of a plurality of modulation ratio ranges that are determined by dividing a possible value range of the modulation ratio into a plurality of regions, and
   the detection angle correcting section obtains the correction information from the correction value map corresponding to the modulation ratio range that includes the modulation ratio at the time the detection angle obtaining section obtains the detection angle.

3. The electric motor drive control apparatus according to claim 2, wherein
   the DC/AC converting section is structured to be able to switch between a plurality of control methods that use different switching methods for conversion from each other,
   the correction information storage section stores the correction information in association with the control methods as well, and
   the detection angle correcting section obtains the correction information from the correction information storage section, based also on the control method at the time the detection angle obtaining section obtains the detection angle.

4. The electric motor drive control apparatus according to claim 3, further comprising:
   a system voltage obtaining section that obtains the system voltage, wherein
   the correction information storage section stores the correction information in association with the system voltage as well, and
   the detection angle correcting section obtains the correction information from the correction information storage section, based also on the system voltage at the time the detection angle obtaining section obtains the detection angle.

5. The electric motor drive control apparatus according to claim 2, further comprising:
a system voltage obtaining section that obtains the system voltage, wherein
the correction information storage section stores the correction information in association with the system voltage as well, and
the detection angle correcting section obtains the correction information from the correction information storage section, based also on the system voltage at the time the detection angle obtaining section obtains the detection angle.

6. An electric motor drive control apparatus including a DC/AC converting section that converts a DC system voltage to an AC voltage by using a detection angle of a resolver provided for a rotor of an AC electric motor, and supplies the AC voltage to the AC electric motor, the electric motor drive control apparatus comprising:
a detection angle obtaining section that obtains the detection angle of the resolver;
a correction information storage section that stores correction information for correcting the detection angle, in association with a modulation ratio that is a ratio of an effective value of a fundamental wave component of the AC voltage to the system voltage; and
a detection angle correcting section that obtains the correction information from the correction information storage section, based on the modulation ratio at the time the detection angle obtaining section obtains the detection angle, and corrects the detection angle based on the correction information, wherein
the correction information storage section stores a correction value map, which defines a correction value for the detection angle, for each of a plurality of modulation ratio ranges that are determined by dividing a possible value range of the modulation ratio into a plurality of regions, and
the detection angle correcting section obtains the correction information from the correction value map corresponding to the modulation ratio range that includes the modulation ratio at the time the detection angle obtaining section obtains the detection angle.

7. The electric motor drive control apparatus according to claim 6, wherein
the DC/AC converting section is structured to be able to switch between a plurality of control methods that use different switching methods for conversion from each other,
the correction information storage section stores the correction information in association with the control methods as well, and
the detection angle correcting section obtains the correction information from the correction information storage section, based also on the control method at the time the detection angle obtaining section obtains the detection angle.

8. The electric motor drive control apparatus according to claim 7, further comprising:
a system voltage obtaining section that obtains the system voltage, wherein
the correction information storage section stores the correction information in association with the system voltage as well, and
the detection angle correcting section obtains the correction information from the correction information storage section, based also on the system voltage at the time the detection angle obtaining section obtains the detection angle.

9. The electric motor drive control apparatus according to claim 6, further comprising:
a system voltage obtaining section that obtains the system voltage, wherein
the correction information storage section stores the correction information in association with the system voltage as well, and
the detection angle correcting section obtains the correction information from the correction information storage section, based also on the system voltage at the time the detection angle obtaining section obtains the detection angle.

* * * * *